United States Patent
Ambros

(10) Patent No.: US 11,703,074 B2
(45) Date of Patent: Jul. 18, 2023

(54) THREAD-FORMING OR SELF-TAPPING SCREW, IN PARTICULAR FOR USE IN LIGHT METAL

(71) Applicant: BAIER & MICHELS GMBH & CO. KG, Ober-Ramstadt (DE)

(72) Inventor: Olaf Ambros, Biblis (DE)

(73) Assignee: BAIER & MICHELS GMBH & CO. KG, Ober-Ramstadt (DE)

(*) Notice: Subject to any disclaimer, the term of this patent is extended or adjusted under 35 U.S.C. 154(b) by 1 day.

(21) Appl. No.: 15/776,020

(22) PCT Filed: Nov. 15, 2016

(86) PCT No.: PCT/EP2016/077737
§ 371 (c)(1),
(2) Date: May 14, 2018

(87) PCT Pub. No.: WO2017/085060
PCT Pub. Date: May 26, 2017

(65) Prior Publication Data
US 2018/0335068 A1 Nov. 22, 2018

(30) Foreign Application Priority Data
Nov. 19, 2015 (DE) .......................... 102015222889.4

(51) Int. Cl.
*F16B 25/00* (2006.01)
(52) U.S. Cl.
CPC ...... *F16B 25/0047* (2013.01); *F16B 25/0021* (2013.01); *F16B 25/0073* (2013.01)
(58) Field of Classification Search
CPC .......................... F16B 25/0047; F16B 25/0021
(Continued)

(56) References Cited

U.S. PATENT DOCUMENTS

| | | | |
|---|---|---|---|
| 2,005,672 A | * | 6/1935 | Chaffee ............... F16B 25/0021 411/414 |
| 2,827,820 A | * | 3/1958 | De Vellier .......... F16B 25/0047 411/411 |

(Continued)

FOREIGN PATENT DOCUMENTS

| | | |
|---|---|---|
| CN | 204664098 U | 9/2015 |
| DE | 19960287 C1 | 7/2001 |

(Continued)

OTHER PUBLICATIONS

International Search Report for PCT/EP2016/077737, dated Mar. 21, 2017.
(Continued)

*Primary Examiner* — Flemming Saether
(74) *Attorney, Agent, or Firm* — Mannava & Kang, P.C.

(57) ABSTRACT

The invention relates to a screw (1), having a shank (3) which is provided with a thread (2) with at least one asymmetrical thread turn (4) with a plurality of windings, wherein the thread has an external diameter (Da), a core diameter (Dk) and a thread pitch (P), wherein the thread turn (4) has thread flanks (7, 8) with a flank angle (phi), wherein the thread flanks (7, 8) have a load-bearing flank (7) and a counter-flank (8) which abut one another directly or indirectly in a thread bottom (9) and at a thread tip (10), and wherein a flank angle (phiL) of the load-bearing flank (7) is smaller than a flank angle (phiG) of the counter-flank (8). The flank angle (phiL) of the load-bearing flank is at least 25°, preferably from 25° to 35°, in particular 30°, and the flank angle (phiG) of the counter-flank is at least 40°, preferably from 40° to 60°, in particular 50°, wherein the flank angle (phi) is from at least 65° to at most 95°. Screws of said type are used, in particular, for direct screw connection in light metal cast components.

15 Claims, 2 Drawing Sheets

(58) Field of Classification Search
USPC .......................................................... 411/414
See application file for complete search history.

(56) References Cited

U.S. PATENT DOCUMENTS

| | | | | |
|---|---|---|---|---|
| 3,129,963 | A | | 4/1964 | Robbins |
| 3,865,006 | A | | 2/1975 | Massoney |
| 5,060,740 | A | | 10/1991 | Yousef et al. |
| 5,061,135 | A | * | 10/1991 | Pritchard ............ F16B 25/0015 411/411 |
| 5,127,784 | A | * | 7/1992 | Eslinger ................ F16L 15/006 285/334 |
| 5,304,023 | A | * | 4/1994 | Toback ................. F16B 33/004 411/387.3 |
| 5,746,039 | A | | 5/1998 | Nystrom |
| 5,947,670 | A | * | 9/1999 | Larson ................ F16B 25/0031 411/387.1 |
| 6,672,813 | B1 | * | 1/2004 | Kajita ................. F16B 25/0031 411/387.4 |
| 6,702,537 | B2 | * | 3/2004 | Neuhengen ......... F16B 25/0015 411/414 |
| 7,682,118 | B2 | * | 3/2010 | Gong ................. F16B 25/0047 411/387.1 |
| 9,046,120 | B2 | * | 6/2015 | Phua ................... F16B 25/0047 |
| 9,695,648 | B2 | * | 7/2017 | Moore .................. F16L 15/001 |
| 9,695,859 | B2 | * | 7/2017 | Wu ...................... F16B 25/0026 |
| 10,247,220 | B2 | * | 4/2019 | Lehtola ............... F16B 25/0084 |
| 10,865,824 | B1 | * | 12/2020 | Litzinger ............. F16B 25/0042 |

FOREIGN PATENT DOCUMENTS

| | | |
|---|---|---|
| DE | 202004006061 U1 | 9/2004 |
| DE | 102010000702 A1 | 7/2011 |
| DE | 102010028344 A1 | 11/2011 |
| EP | 3056747 A1 | 8/2016 |
| WO | 2006/043169 A1 | 4/2006 |

OTHER PUBLICATIONS

International Preliminary Report on Patentability for PCT/EP2016/077737, dated May 24, 2018.

Office Action for German Patent Application No. 102015222889.4, dated May 30, 2017.

Official Action dated Aug. 26, 2019 in corresponding Chinese Application No. 201680067690.X (with English translation).

Official Action dated May 12, 2020 in corresponding Chinese Application No. 201680067690.X (with English translation).

Official Action dated Jun. 21, 2019 in corresponding European Application No. 16810257.2 (with English translation).

Official Action dated Oct. 6, 2017 in corresponding German Application No. 102015222889.4 (with English translation).

Official Action dated Jul. 12, 2018 in corresponding German Application No. 102015222889.4 (with English translation).

"ISO Metric Thread Screw" Gaugestools, online at: https://www.gaugestools.com/iso-metric-screw-thread (2021) pp. 1-5.

"Thread tolerance calculator: Metric ISO thread DIN 13" online at: http://www.iso-gewinde.at/ (2007) pp. 1-3.

"Gewindetoleranzrechner: Metrisches ISO-Gewinde DIN 13" online at: http://www.iso-gewinde.at/ (2007) pp. 1-2.

Colás, Rafael et al., "Encyclopedia of Iron, Steel and Their Alloys, vol. I: Their Activities—Cast Iron", CRC Press (2016), pp. 1183-1184 and 1237.

FABORY Fasteners, Product Technical Information, 77 pages.

"15.2 Metrisches ISO-Gewinde" Gewindetabellen, pp. 484-501.

"Bolzengewinde: M5x0,8-6g", Gewinde-Toleranzrechnung: Metrische ISO-Gewinde DIN 13 online at: http://www.iso-gewinde.at/printBolzen.html, Version 1.1 (Aug. 2007) 1 page.

"15.2 Metrisches ISO-Gewinde", Gewindetabellen, pp. 484-501, Jun. 2, 2013, relevant p. 498. <https://www.emuge-franken-bg.com/attachments/article/97/15%20Gewindetabellen.pdf>.

Fabory, "Fastener, Product Technical Information", Jan. 31, 1997, 77 pages. Relevant p. 15-15-1. <http://www.mettex.co.uk/wp-content/uploads/2014/11/Fabory-Fasteners-Technical-lnformation.pdf>.

* cited by examiner

THREAD-FORMING OR SELF-TAPPING SCREW, IN PARTICULAR FOR USE IN LIGHT METAL

This application is a National Stage application of International Patent Application No. PCT/EP2016/077737, filed 15 Nov. 2016, which claims priority to German Patent Application No. 102015222889.4, filed 19 Nov. 2015, the contents of all of which are hereby incorporated by reference in their entireties. To the extent appropriate, a claim of priority is made to each of the above-disclosed applications.

TECHNICAL FIELD

The invention relates to a thread-forming or self-tapping screw, in particular for direct screw connection into light metal or alloys thereof and into brass or into other non-ferrous metals, having a shank provided with a thread with at least one asymmetric thread turn with a plurality of windings. The thread formed in a thread-forming or self-tapping manner has, as is usual for threads, an external diameter, a core diameter and a thread pitch.

The thread turn has thread flanks with a flank angle phi, the thread flanks having a load-bearing flank and a counter-flank which abut one another directly or indirectly in a thread bottom and at a thread tip and the flank angle phiL of the load-bearing flank being smaller than the flank angle phiG of the counter-flank.

Screws of this type are, in particular, used for the so-called direct screw connection, in the case of which the screw itself forms a thread into a nut component which generally has a corresponding through hole or blind hole to receive the screw.

BACKGROUND

A self-tapping screw is known from DE 10 2010 028 344 A1 for use in light metal materials which has an asymmetric thread with a flank angle of 27° to 36°, and the thread can have a metric pitch.

A screw is known from DE 10 2010 000 702 A1 which has a plastic thread, in the case of which a gap is present between individual screw windings, and in the case of which the tip angle of the symmetric thread is approx. 40° and does not form a sharp thread edge, but rather has a flat portion. The invention disclosed there can also essentially be an asymmetric thread or a self-cutting thread.

A self-tapping screw is known from DE 199 60 287 C1 for screwing into light metal, in the case of which a flank angle between the load-bearing flank and the rear flank of 32° to 42° is considered expedient for screws made of steel, however, for screws made of a tough aluminium alloy, 58° to 68° is considered expedient. The individual thread turns have an incline directed away from the screw head. The object of a load-bearing flank is described in detail, the ratio of thread pitch to thread external diameter is indicated to be smaller than 0.25 such that a thread with thread turns located close to one another results and a relatively large number of thread turns is anchored in the component.

The aim of the invention is to provide a screw for direct screw connection with sufficient strength and with a favourable material flow in the component to be screwed.

SUMMARY

A thread-forming or self-tapping screw according to the invention has a shank with an asymmetric thread turn with a plurality of windings, the thread having an external diameter, a core diameter and a thread pitch. The thread turn has thread flanks with a flank angle phi, the thread flanks having a load-bearing flank and a counter-flank which abut one another directly or indirectly in a thread bottom and at a thread tip and the flank angle phiL of the load-bearing flank being smaller than the flank angle phiG of the counter-flank. The flank angle phiL of the load-bearing flank is at least 25°, preferably 25° to 35°, in particular 30° and the flank angle phiG of the counter-flank is at least 40°, preferably 40° to 60°, in particular 50°, the flank angle phi being from at least 65° to at most 95°.

The counter-flank is aligned in a direction towards the tip and the load-bearing flank is aligned in a direction away from the tip, i.e. towards a head of the screw. Directly abutting, in this case, means that only transition regions, in particular transition radii caused during manufacturing are present.

It has been found that in the case of these angles, the thread flanks, upon penetration into the nut component, advantageously make its material flow and thus generate a large flank coverage such that a screw of this type is particularly suitable for direct screw connection into light metals or alloys thereof and in particular into light metal pressure casting since a high failure torque is achieved.

The ratio $Q1=P/Da$ of the external diameter (Da) in relation to the thread pitch (P) can advantageously be 3.0 to 3.6, preferably 3.3 to 3.4 and the ratio $Q2=Dk/P$ of the core diameter (Dk) in relation to the thread pitch (P) can be 2.0 to 2.5, preferably 2.2 to 2.4.

In comparison to metric systems, a larger profile surface of the thread is thus provided, whereby a larger surface coverage is achieved, which allows a higher pretensioning force precisely when the screw-in depth is low. This is the case when the thread has an effective bearing length which is less than 1.5 times the nominal diameter.

The load-bearing flank and the counter-flank can advantageously abut one another indirectly in a thread bottom forming a transition region with a longitudinal extension of at least 0.01 times and at most 0.2 times the pitch P.

The transition region can advantageously be sharp-edged at the thread tip and have a tip radius Rs of at most 0.15 mm. As a result, the forming of the thread tip into the nut component is simplified. This is, in particular, advantageous when there is a cast skin present in the case of a nut component with a cast core hole which, due to physical reasons, has a greater strength than the base material of the nut component.

The transition region can advantageously have a fillet in the thread bottom.

The transition region can advantageously have a different radius RgL and RgG in the thread bottom for the load-bearing flank and for the counter-flank which are preferably smaller than 1 mm, the radius RgL of the load-bearing flank in the thread bottom being at least 1.5 times and at most 3 times greater than the radius RgG of the counter-flank, the radius RgL is preferably double the size of the radius RgG.

The profile of the load-bearing flank and the profile of the counter-flank can advantageously be formed in a straight line. As a result, the force transfer and the forming of the thread into the material of the nut component is facilitated.

The ratio of the flank angle phiL of the load-bearing flank to the flank angle phiG of the counter-flank can advantageously be at least 0.4 and at most 0.85, preferably 0.55 to 0.7, in particular 0.6. The angle bisector of the flank angle phi with the perpendicular to the central axis of the screw can advantageously form a positive angle in the head direction in the range of 2.5° to 17.5°.

Good properties of the screw connection are expected within these limits of the asymmetric design of the thread since there is robust support of the load-bearing flanks.

The thread can advantageously have a circular geometry. A circular thread geometry leads to a high pretensioning force transfer due to the flank coverage running over the entire circumference which is, for example, not the case with a trilobular design of the thread geometry.

The shank can advantageously have a threaded end with a thread beginning and an attachment tip can be formed at the threaded end before the thread beginning, whose length La is at least 0.3 times the thread pitch P and whose diameter DAS is at most 0.95 times the core diameter.

In this case, the attachment tip not bearing any thread turn can be formed cylindrically or running in a tapered manner and can be filleted or bevelled at the tip.

The use of an attachment tip can, upon introduction of the screw into a fastening hole, ensure radial guiding of the screw when it is screwed in and tilting or inclined screwing can be prevented.

The thread pitch can advantageously be at least 1.5 times, preferably at least 1.8 to 2 times and at most 2.5 times the pitch of a metric thread of the same nominal diameter. Quick screwing can thus be achieved until reaching the head contact.

The core diameter can advantageously be 0.8 times to 0.95 times, preferably roughly 0.9 times the core diameter of a metric thread of the same nominal diameter. As a result, a greater effectively usable profile height results with respect to a metric thread.

The shank can advantageously have a threaded end with the thread beginning and a groove region with a thread profile fully formed in relation to the thread tip, and the load-bearing flank can be present at the threaded end at the thread beginning over 0.5 to 2 windings, preferably over 0.6 to 0.95 windings.

The provision of a groove region with continuously increasing thread profile reduces the rotational torques for grooving the thread when the screw is screwed in.

The thread profile can advantageously increase in the groove region from zero to the full height. This increase can, in particular, take place continuously and lead to the formation of a counter-thread in the nut component.

The thread can advantageously have a conical increase of the external diameter in the head direction. This conicity can be in the region of 0.5° to 3°. In this case, a distinction must be made between the convergence angle, i.e. the angle between two straight lines which are applied to the upper and lower edge of a two-dimensional projection of the screw, and the cone angle which is the angle that lies between a parallel line to the central line of a two-dimensional projection of the screw and a straight line which is applied to an edge. The cone angle, also referred to as the taper angle, is half the size of the convergence angle.

The conicity means that the continuous further forming of the thread in the nut component takes place beyond the groove region during the screwing-in process even in the case of conical core holes in the nut component. The configuration of the core hole is dependent upon the manufacturing process of the nut component, different materials can also lead to different geometries of the core hole. A balancing of the flank coverage otherwise reducing in a conical core hole with increasing screw-in depth takes place in the head direction of the thread due to the conicity of the thread.

BRIEF DESCRIPTION OF THE DRAWINGS

The screw according to the invention is explained based on the drawing. It shows.

DETAILED DESCRIPTION OF THE PREFERRED EMBODIMENTS

Figure 1:
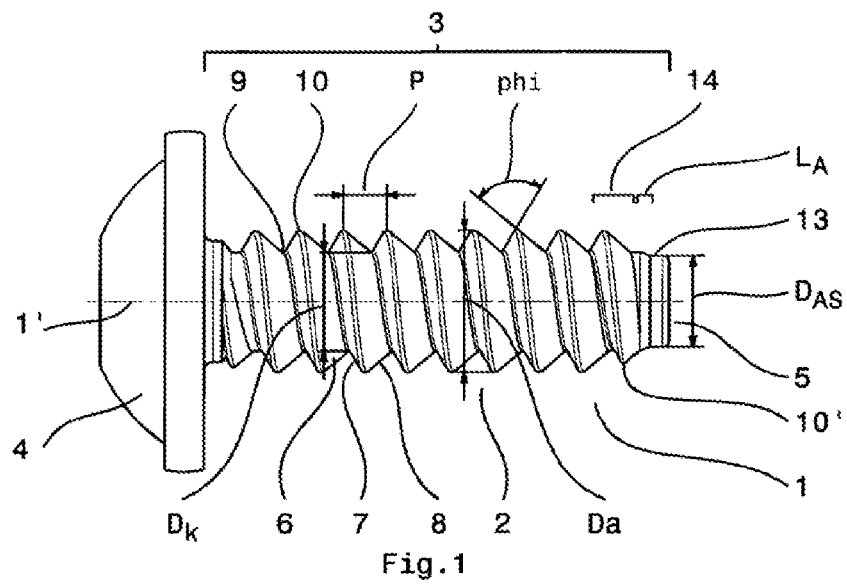
FIG. 1 a screw according to the invention with a head and a screw tip and a thread in a side view.

The screw 1 according to the invention represented in FIG. 1 in a side view for the screw connection, in particular in light metal casting has a shank 3 provided at least partially with a thread 2 extending along a longitudinal axis 1' with an external diameter Da and a core diameter Dk. A head 4 of the screw arranged at one end of the screw 1 with interior force application surfaces, not represented, is also represented, but is not relevant for this invention. A threaded end of the shank 3 opposite the head 4 is formed as the screw tip 5.

The shank 3 has been provided with an asymmetric thread turn 6 with a plurality of windings to produce the thread 2, said thread turn extends at least along a part of the shank 3 with a fully-developed thread profile.

Figure 3:
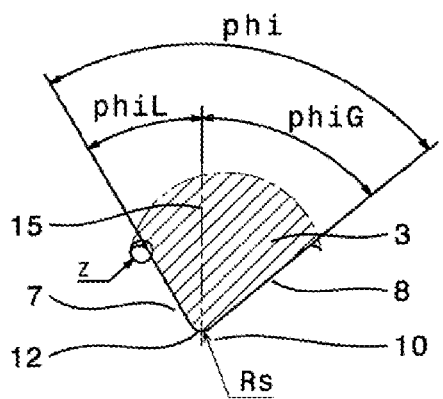
FIG. 3 the forming of the thread of the screw from FIG. 1 in the region of a thread tip in detail.
Figure 4:
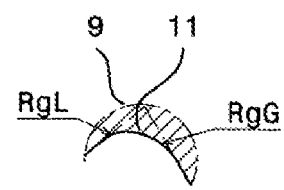
FIG. 4 the forming of the thread of the screw from FIG. 1 in the region of a thread bottom in detail.

The thread turn 6 has thread flanks 7, 8 with a flank angle phi which abut one another in a thread bottom 9 and at a thread tip 10 forming, respectively, a transition region 11, 12 discernible in FIGS. 3 and 4.

The thread 2 has an external diameter Da, a core diameter Dk and a thread pitch P.

The thread flank 7 is a load-bearing flank since it receives the pretensioning forces caused by the screw between the screw head 4 and the thread in the nut component.

The thread flank 8 is a counter-flank which supports the load-bearing flank 7 against the core of the screw.

The thread 2 has a flank angle phi of approx. 80° and is formed asymmetrically, the flank angle phiL of the load-bearing flank 7 at approx. 30° being smaller than the flank angle phiG of the counter-flank 8 at approx. 50° is represented in FIG. 3. The ratio of the flank angle phiL of the load-bearing flank to the flank angle phiG of the counter-flank is 0.6. Since the flank angle phiL of the load-bearing flank is smaller than the flank angle phiG of the counter-flank, the thread 2 seems tilted towards the head 4, see FIG. 5.

The thread pitch P is at 1.5 mm, in the case of a nominal diameter of 5 mm, 1.9 times the pitch of a metric standard thread of the same nominal diameter, which is 0.8 mm in the case of this nominal diameter.

The core diameter is at 3.5 mm, in the case of a nominal diameter of 5, 0.87 times the core diameter of a metric thread of the same nominal diameter which is 3.995 mm in the case of this nominal diameter in the tolerance class 6 g.

The screw 1 has an attachment tip 13 formed without a thread with a length La at the threaded end before the thread beginning, which is roughly 0.3 times the thread pitch P. The attachment tip 13 has a diameter $D_{AS}$ which is roughly 0.95 times the core diameter Dk.

Figure 2:
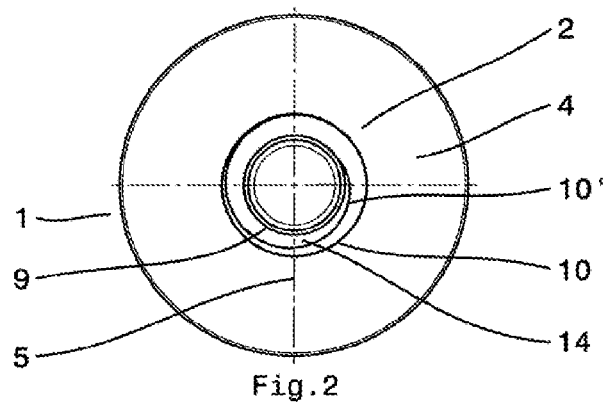
FIG. 2 the screw from FIG. 1 in a plan view to the screw tip.

The shank 3 also has a thread beginning at the threaded end which extends, as represented in FIG. 2, over approx. 320°, i.e. over approx. 0.9 windings and forms a groove region 14 with a thread profile 10' fully formed in relation to the thread tip and the load-bearing flank. A profile of the thread turn is present in the groove region 14 with a contour of the external diameter that is increasing more or less uniformly which leads to progressive forming of the thread into the nut component.

However, in the groove region 14 it is irrelevant whether the counter-flank is already fully formed. The thread 2 adjoining the groove region 14 facilitates the further forming of the nut thread introduced into the nut part by means of the groove region 14 and is thus also formed in a thread-forming or self-tapping manner, even if the primary deformation takes place by way of the groove region 14 and smoothening and calibrating then takes place.

In the case of an external diameter of the thread increasing in the head direction, as can be provided for example by conicity (FIG. 6a-c), further deforming of the material of the nut component also takes place after the groove region with progressive screwing of the screw into the nut component.

FIG. 2 shows the screw from FIG. 1 in a plan view to the screw tip 5. It can be discerned that the thread 2 has a circular geometry with the thread tips 10 and the thread bottom 9, just like the head 4 which has no significance here for the invention.

In the groove region 14, the thread profile 10' runs proceeding from the thread bottom 9 with the core diameter Dk (FIG. 1) at a height of the thread tip from zero to the full height of the thread tips 10 on the external diameter Da (FIG. 1).

The ratio Q1=Da/P of the external diameter Da in relation to the thread pitch P, in the case of an external diameter Da of 5 and a thread pitch P of 1.5, is approx. 3.3 and the ratio Q2=Dk/P of the core diameter Dk of 3.5 in relation to the thread pitch P is approx. 2.3.

It is discernible in FIG. 3 that the profile of the load-bearing flank 7 and the profile of the counter-flank 8 is a straight line and that the load-bearing flank 7 and the counter-flank 8 abut one another in the thread bottom 9 and at the thread tip 10 indirectly forming a transition region 11, 12 with a longitudinal extension of roughly 0.01 times the pitch P at the thread tip 10 and at most 0.2 times the pitch P in the thread bottom 9.

The transition region 12 at the thread tip 10 should be as sharp-edged as possible which is provided with a tip radius Rs of at most 0.15 mm.

As already explained, the flank angle phi is divided asymmetrically, the flank angle phiL of the load-bearing flank 7 being indicated with respect to a perpendicular 15 to the longitudinal axis 1' of the screw 1 and being smaller than the flank angle phiG of the counter-flank 8 which is also indicated with respect to the perpendicular 15 to the longitudinal axis 1' of the screw 1, but in the other direction.

The transition region 11 in the thread bottom 9 represented in FIG. 4 in detail Z from FIG. 3 has a fillet, a different radius RgL and RgG being present for the load-bearing flank 7 and the counter-flank 8 which is 0.05 and 0.1 mm here. The radius RgL in the thread bottom of the load-bearing flank 7 is thus double the size of the radius RgG of the counter-flank 8.

Figure 5:
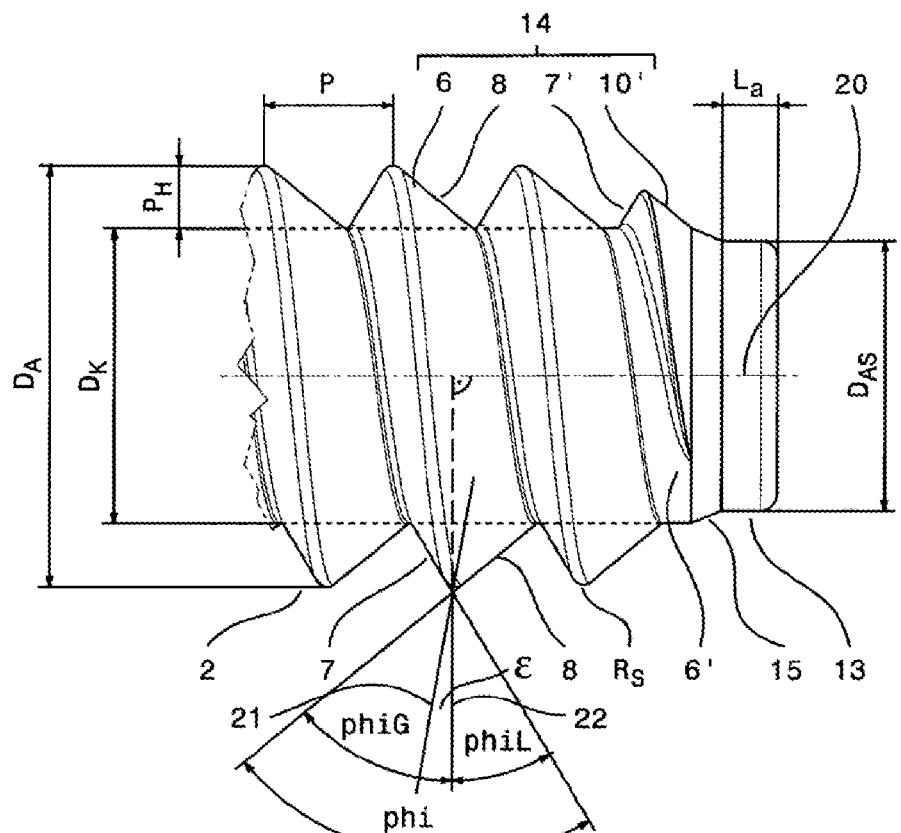
FIG. 5 the forming of the thread at the screw tip in detail.

The threaded end of the screw 1 from FIG. 1 is represented in FIG. 5 in detail. An attachment tip 13 formed without a thread with a length La is formed before the thread 2 beginning which is roughly 0.4 times the thread pitch P. The attachment tip 13 has a diameter $D_{AS}$ which is roughly 0.9 times the core diameter Dk.

The shank 3 also has a thread beginning with a thread turn 6' at the threaded end which has a thread profile increasing from zero up to the profile height $P_H$ and which, as represented in FIG. 2, extends over approx. 320°, i.e. over approx. 0.9 windings and forms a groove region 14. The thread profile of the thread turn 6' is fully formed in relation to the thread tip 10' and the load-bearing flank 7, however, the load-bearing flank 7' does not directly adjoin the counter-flank 8 of the subsequent thread turn 6 in the groove region 14, but rather there is a gap present such that the groove region 14 has the pitch P.

In the bearing region of the thread, which adjoins the groove region 14, the profile height $P_H$ increases by 1.05 times to 1.5 times with respect to a metric thread, for example in the case of DN 5 by 1.1 times. This is achieved by the core diameter $D_K$ being smaller than in the case of a metric thread.

A transition region 15, formed conically in the present case, is between the groove region 14 and the attachment tip 13. The diameter increases from the diameter $D_{AS}$ to the core diameter Dk in the groove region 14. The attachment tip itself is rounded, but it is also possible to provide a bevel.

Proceeding from the angle phiL of the load-bearing flank 7 of 30° and the angle phiG of the counter-flank 8 of 50°, the flank angle phi of 80° results and the angle bisector 21 of the flank angle phi with a perpendicular 22 to a central axis 20 of the screw forms a positive angle epsilon of 10° in the head direction.

Figure 6A:
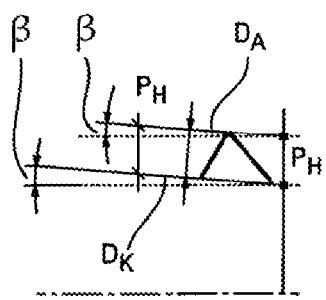
FIG. 6*a-c* different embodiments of the thread with a conical increase of the external diameter in the head direction.
Figure 6B:
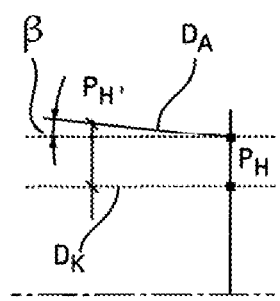
Figure 6C:
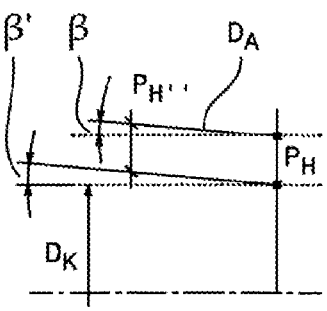

FIG. 6A-C show three different embodiments of the thread with a conical increase of the external diameter $D_A$ in the head direction. FIG. 6A shows an increase of the core diameter $D_K$ and of the external diameter $D_A$ with a cone angle beta with constant pitch and profile height $P_H$.

FIG. 6b shows an increase of the profile height $P_H$ with a cone angle beta of the external diameter $D_A$ with constant core diameter $D_K$, FIG. 6c shows an increase of the profile height $P_H$ and of the core diameter $D_K$, the cone angle beta' of the core diameter $D_K$ being smaller than the cone angle beta of the external diameter $D_A$.

Hardened steel, stainless steels or highly corrosion-resistant austenitic materials are, in particular, considered as screw material, the listing being only exemplary and not exhaustive.

The invention claimed is:

1. A thread-forming or self-tapping screw, comprising: a shank provided with a thread with at least one asymmetric thread turn with a plurality of windings, wherein
   (i) the thread has an external diameter ($D_A$), a core diameter ($D_K$) and a thread pitch (P),
   (ii) the thread turn has thread flanks with a flank angle phi,
   (iii) the thread flanks have a load-bearing flank and a counter-flank which abut one another at a thread bottom and at a thread tip, wherein the load-bearing flank and the counter-flank form a transition region at the thread bottom with a longitudinal extension of at least 0.01 times and at most 0.2 times the pitch P, and
   (iv) a flank angle phiL of the load-bearing flank is smaller than a flank angle phiG of the counter-flank,
   wherein a ratio Q1=$D_A$/P of the external diameter ($D_A$) in relation to the thread pitch (P) is from 3.0 to 3.6, and a ratio Q2=$D_K$/P of the core diameter ($D_K$) in relation to the thread pitch (P) is from 2.0 to 2.5.

2. The screw according to claim 1, wherein the flank angle phiL of the load-bearing flank is at least 25°, the flank angle phiG of the counter-flank is at least 40°, and the flank angle phi is at least 65°.

3. The screw according to claim 2, wherein the shank has a threaded end with a thread beginning and a groove region is present with a thread profile fully formed in relation to the thread tip and to the load-bearing flank at the threaded end at the thread beginning over 0.5 to 2 windings.

4. The screw according to claim 3, wherein the thread profile increases in the groove region from zero to a full profile height $P_H$.

5. The screw according to claim 1, wherein the transition region and has a tip radius Rs of at most 0.15 mm.

6. The screw according to claim 1, wherein the transition region has a fillet in the thread bottom.

7. The screw according to claim 6, wherein the transition region has a different radius RgL and RgG in the thread bottom for the load-bearing flank and for the counter-flank which is smaller than 1 mm, wherein the radius RgL of the load-bearing flank in the thread bottom is greater than the radius RgG of the counter-flank by at least 1.5 times and at most 3 times.

8. The screw according to claim 1, wherein a profile of the loadbearing flank and a profile of the counter-flank is a straight line.

9. The screw according to claim 1, wherein a ratio of the flank angle phiL of the load-bearing flank to the flank angle phiG of the counter-flank is at least 0.4 and at most 0.85.

10. The screw according to claim 1, wherein an angle bisector of the flank angle phi with a perpendicular to a central axis of the screw forms a positive angle epsilon in a head direction in a range of 2.5° to 17.5°.

11. The screw according to claim 1, wherein the thread has a circular geometry.

12. The screw according to claim 1, wherein the shank has a threaded end with a thread beginning, an attachment tip is formed at the threaded end before the thread beginning, a length $L_A$ of the attachment tip is at least 0.3 times the thread pitch P and a diameter $D_{AS}$ of the attachment tip is at most 0.95 times the core diameter ($D_K$).

13. The screw according to claim 1, wherein the thread has a conical increase of the external diameter in a head direction.

14. The screw according to claim 1, wherein the screw is made of hardened steel, stainless steel, or corrosion-resistant materials for direct screw connection into light metal or alloys thereof, brass, or non-ferrous metals.

15. A thread-forming or self-tapping screw, comprising:
a shank provided with a thread with at least one asymmetric thread turn with a plurality of windings, wherein
(i) the thread has an external diameter ($D_A$), a core diameter ($D_K$) and a thread pitch (P),
(ii) the thread turn has thread flanks with a flank angle phi,
(iii) the thread flanks have a load-bearing flank and a counter-flank which abut one another at a thread bottom and at a thread tip, wherein the load-bearing flank and the counter-flank form a transition region at the thread bottom with a longitudinal extension of at least 0.01 times and at most 0.2 times the pitch P,
(iv) a flank angle phiL of the load-bearing flank is smaller than a flank angle phiG of the counter-flank, and
(v) the flank angle phiL of the load-bearing flank is at least 25°, the flank angle phiG of the counter-flank is at least 40°, and the flank angle phi is at least 65°,
wherein a ratio $Q1=D_A/P$ of the external diameter ($D_A$) in relation to the thread pitch (P) is from 3.0 to 3.6, and a ratio $Q2=D_K/P$ of the core diameter ($D_K$) in relation to the thread pitch (P) is from 2.0 to 2.5.

* * * * *